United States Patent
Huang et al.

(10) Patent No.: US 11,462,970 B2
(45) Date of Patent: Oct. 4, 2022

(54) COOLING MECHANISM BETWEEN LINEAR MOTOR ROTOR AND PLATFORM COUPLED THERETO

(71) Applicant: HIWIN MIKROSYSTEM CORP., Taichung (TW)

(72) Inventors: Min-Chang Huang, Taichung (TW); Cheng-Te Chi, Taichung (TW); Chao-Chin Teng, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 725 days.

(21) Appl. No.: 16/430,059

(22) Filed: Jun. 3, 2019

(65) Prior Publication Data
US 2020/0381980 A1 Dec. 3, 2020

(51) Int. Cl.
*H02K 9/19* (2006.01)
*H02K 9/00* (2006.01)

(52) U.S. Cl.
CPC .............. *H02K 9/19* (2013.01); *H02K 9/00* (2013.01)

(58) Field of Classification Search
CPC ............ H02K 9/00; H02K 9/19; H02K 9/193; H02K 9/197; H02K 41/02; H02K 41/025; H02K 41/03; H02K 41/031; H02K 41/033; H02K 41/035; H02K 41/0352; H02K 41/0356; H02K 41/0358
USPC .................................... 310/120.29
See application file for complete search history.

(56) References Cited

U.S. PATENT DOCUMENTS

| | | | | |
|---|---|---|---|---|
| 9,968,002 B2 * | 5/2018 | Wang | ...................... | H02K 9/00 |
| 2004/0201291 A1 * | 10/2004 | Hoppe | .................. | H02K 9/227 |
| | | | | 310/52 |
| 2016/0164391 A1 * | 6/2016 | Chen | ...................... | H02K 41/02 |
| | | | | 310/12.29 |
| 2018/0091024 A1 * | 3/2018 | Huang | .................. | H02K 9/227 |
| 2018/0183311 A1 * | 6/2018 | Luo | ...................... | H02K 41/031 |

FOREIGN PATENT DOCUMENTS

| | | | | | |
|---|---|---|---|---|---|
| CN | 107910977 A | * | 4/2018 | ............ | H02K 41/02 |
| DE | 29718566 | | 12/1997 | | |
| DE | 102016114742 A1 | | 2/2018 | | |
| JP | 2004312983 A | * | 11/2004 | ............ | F16C 29/063 |
| JP | 2005065425 A | * | 3/2005 | | |
| JP | 2005229786 A | * | 8/2005 | | |
| JP | 2013212024 A | * | 10/2013 | | |
| KR | 20120100596 A | * | 9/2012 | | |
| WO | WO-03005538 A1 | * | 1/2003 | ............ | H02K 41/03 |

* cited by examiner

*Primary Examiner* — Jeremy A Luks
(74) *Attorney, Agent, or Firm* — Muncy, Geissler, Olds & Lowe, P.C.

(57) ABSTRACT

The present invention provides a cooling mechanism between a linear motor rotor and a platform coupled thereto, characterized essentially in that a cooling portion is provided between the rotor and the platform, and further in that heat transfer is blocked between the cooling portion and the platform, thereby preventing heat received by the cooling portion during heat dissipation from being transferred to the platform, so as to ensure the precision of the platform.

5 Claims, 6 Drawing Sheets

COOLING MECHANISM BETWEEN LINEAR MOTOR ROTOR AND PLATFORM COUPLED THERETO

BACKGROUND OF THE INVENTION

1. Field of the Invention

The present invention relates to the technique of cooling of a motor, and particularly to a cooling mechanism between a linear motor rotor and a platform coupled thereto.

2. Description of the Related Art

The technique of bringing heat generated during operation of a motor away from the motor through a continuously flowing fluid is often utilized as the motor cooling technique to prevent influences of heat on the performance of the motor. However, heat generated during operation of the motor has influences not only on the performance of the motor, but also on motion parts connected directly to the motor, such as a motion platform used in precision machining. As the motion platform is coupled to a rotor of the linear motor and displaceable along with the movement of the rotor, heat from the motor that is transferred to the motion platform causes a declined precision and even deformations of the motion platform, which lead to the deficiency of an insufficient precision for precision machining.

It is known in prior art to provide a tubing member such as a copper tube for fluid flow between the rotor and the motion platform to reduce heat transferred to the motion platform from the motor in order to avoid the above-mentioned deficiency of declined precision. However, as one side of the copper tube is in contact with a coupled part on the side of the motion platform whereas the other side of the copper tube is separated from the motor rotor without direct contact, heat from the motor rotor is partially transferred to the motion platform due to the direct contact between the copper tube and the motion platform during transfer of heat from the motor rotor to the copper tube over the air, which leads to variations in the size of the motion platform, and influences the precision in its displacement.

SUMMARY OF THE INVENTION

In view of this, it is a main object of the present invention to provide a cooling mechanism between a linear motor rotor and a platform coupled thereto that can reduce the influence of heat from the motor on the motion platform and ensure the precision of the motion platform.

Therefore, to achieve the object mentioned above, the present invention provides a cooling mechanism between a linear motor rotor and a platform coupled thereto, characterized essentially in that a cooling portion is sandwiched between the rotor and the platform, and further in that heat transfer is blocked between the cooling portion and the platform, thereby preventing heat received during heat dissipation by the cooling portion from being transferred to the platform so as to ensure the precision of the platform.

Specifically, among the linear motor, the platform, and the cooling portion included in the cooling mechanism between the linear motor rotor and the platform coupled thereto, the cooling portion has a coupling seat positioned between the base of the platform and the rotor, a cooler is positioned between the coupling seat and the rotor, a coupling plane is positioned on one side of the cooler facing the coupling seat, and an insulating layer is positioned between the coupling plane and the coupling seat, in such a manner that the coupling plane, the insulating layer, and the coupling seat overlap each other closely, and the insulating layer blocks direct contact between the coupling plane and the coupling seat.

The insulating layer may be adhesive to provide adhesion force for adhering the coupling plane to the coupling seat.

Further, for ease of manufacture, assembly, and machining, the cooler includes two hollow extruded aluminum bars in the shape of elongated strips that are obtained from aluminum material through a process of extrusion. Each end of a bent cascading tube is coupled to one end of the long axis of the extruded aluminum bars, and one end of two fitting tubes is secured respectively to the other end of the long axis of the extruded aluminum bars, in such a manner that the hollow interior of the extruded aluminum bars, the inner space of the cascading tube, and the inner space of the fitting tubes are in concatenation and communication with each other, thereby providing a passage where external fluid enters and flows.

The coupling plane is positioned on one side of the long axis of the extruded aluminum bars.

For further improvement of thermal insulation effect, the cooling portion further includes an insulating pad positioned between the coupling seat and the base to block direct contact between the coupling seat and the base.

The insulating pad and the insulating layer may be a product providing adhesion, such as a double-sided adhesive tape.

Further, the base, the coupling seat, and the rotor may be coupled via a general configuration in which, for example, a bar-shaped coupler passes through the base and the coupling seat so as to be coupled to the rotor. In order to ensure a suitable space between the cooler and the rotor for the purpose of thermal insulation, a spacer seat of a thickness greater than that of the cooler is sandwiched between the coupling seat and rotor. As such, a suitable space is provided between the cooler and the rotor.

The spacer seat and the extruded aluminum bars may be integrally molded, and the side face of the spacer seat adjacent to the coupling plane is positioned in the same plane as the coupling plane.

DETAILED DESCRIPTION OF THE PREFERRED EMBODIMENTS

Figure 1:
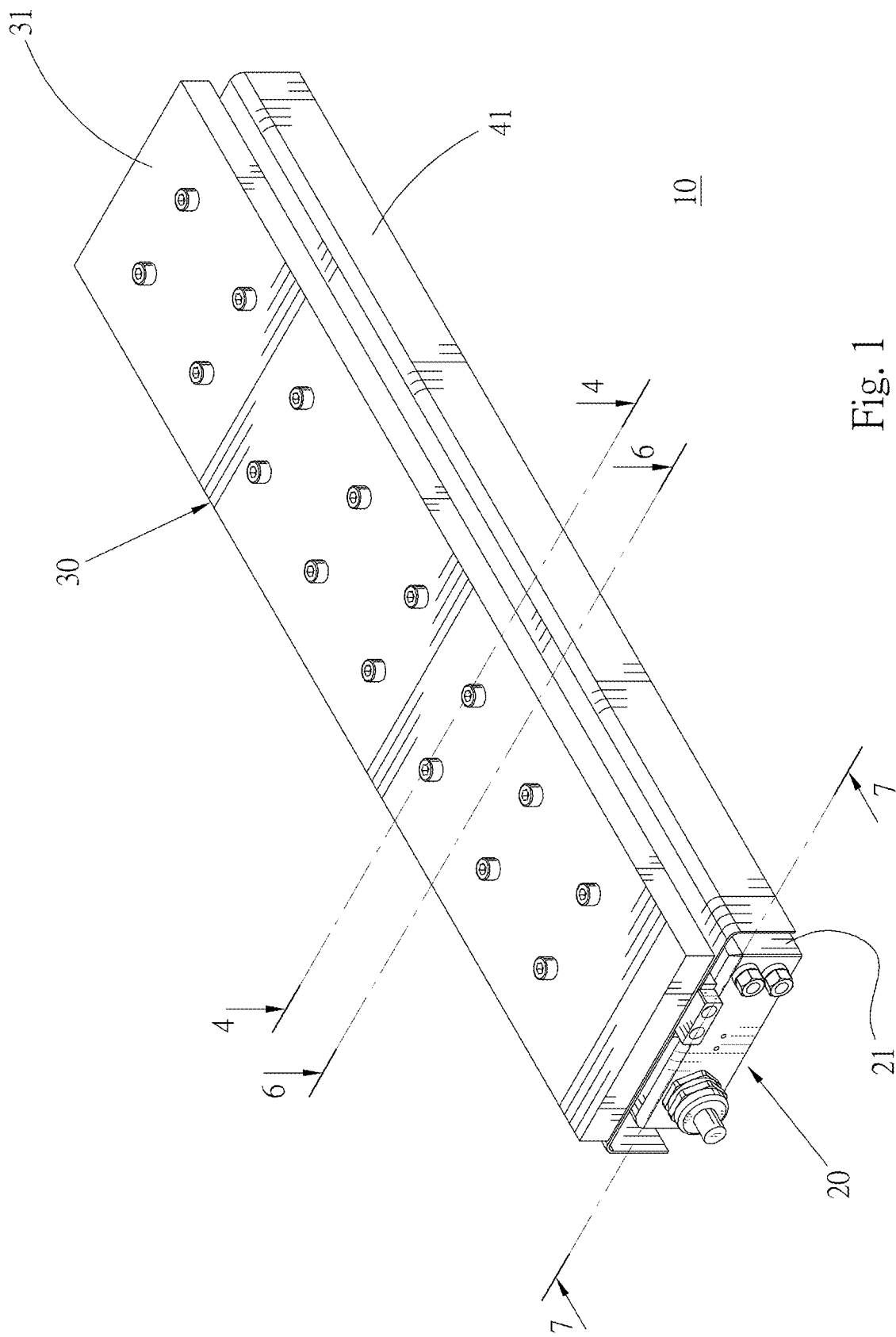
FIG. 1 is a 3D view of a preferred embodiment of the present invention.
Figure 2:
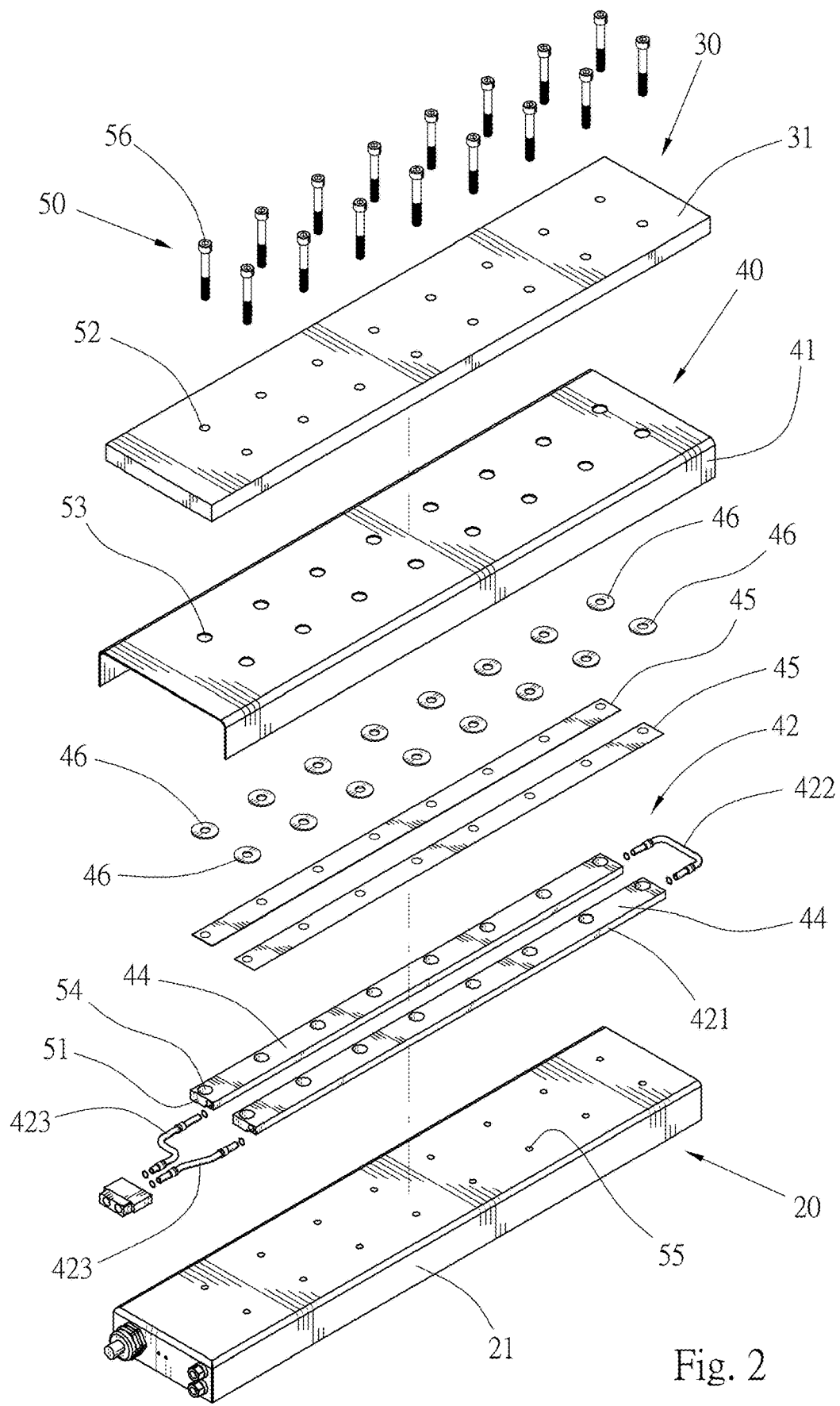
FIG. 2 is an exploded view of a preferred embodiment of the present invention.
Figure 3:
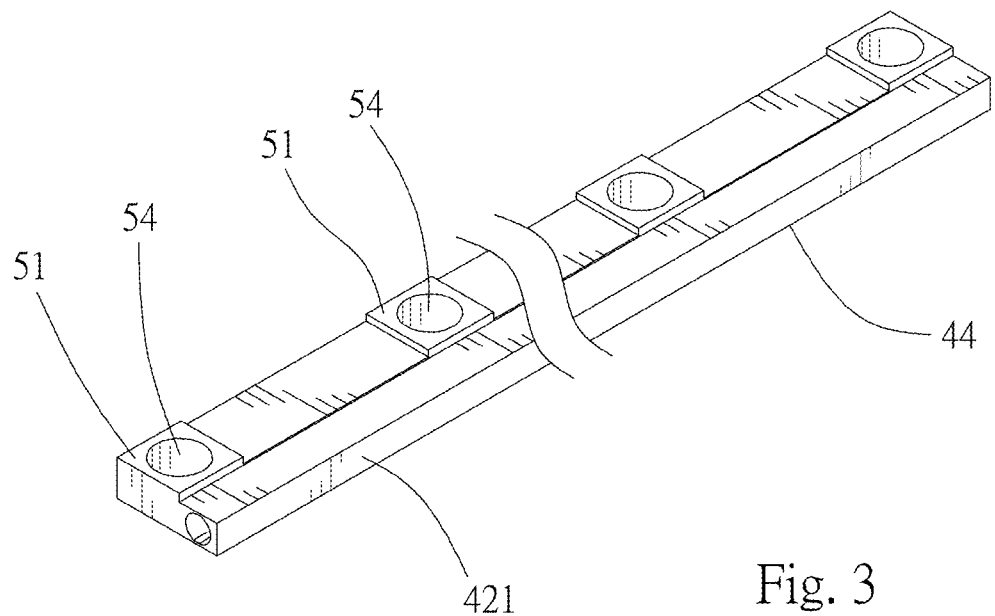
FIG. 3 is a 3D view of an extruded aluminum bar according to a preferred embodiment of the present invention.
Figure 4:
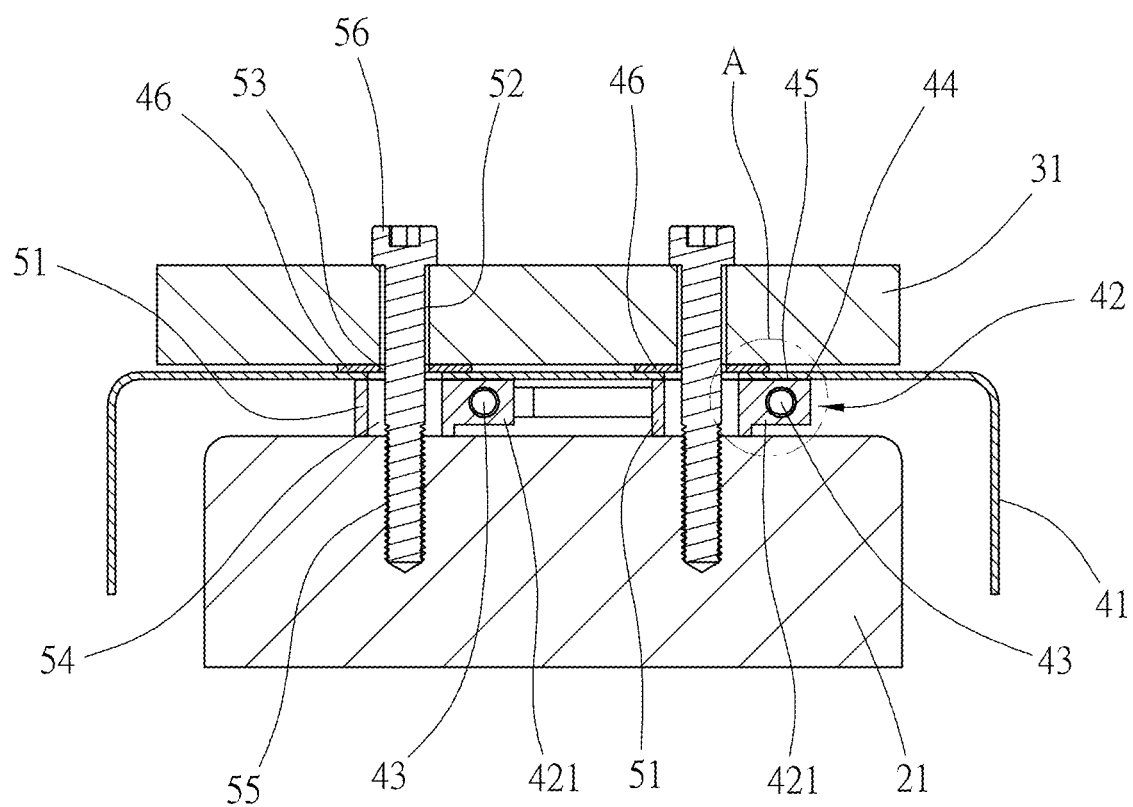
FIG. 4 is a sectional view of a preferred embodiment of the present invention along the section line 4-4 in FIG. 1.
Figure 5:
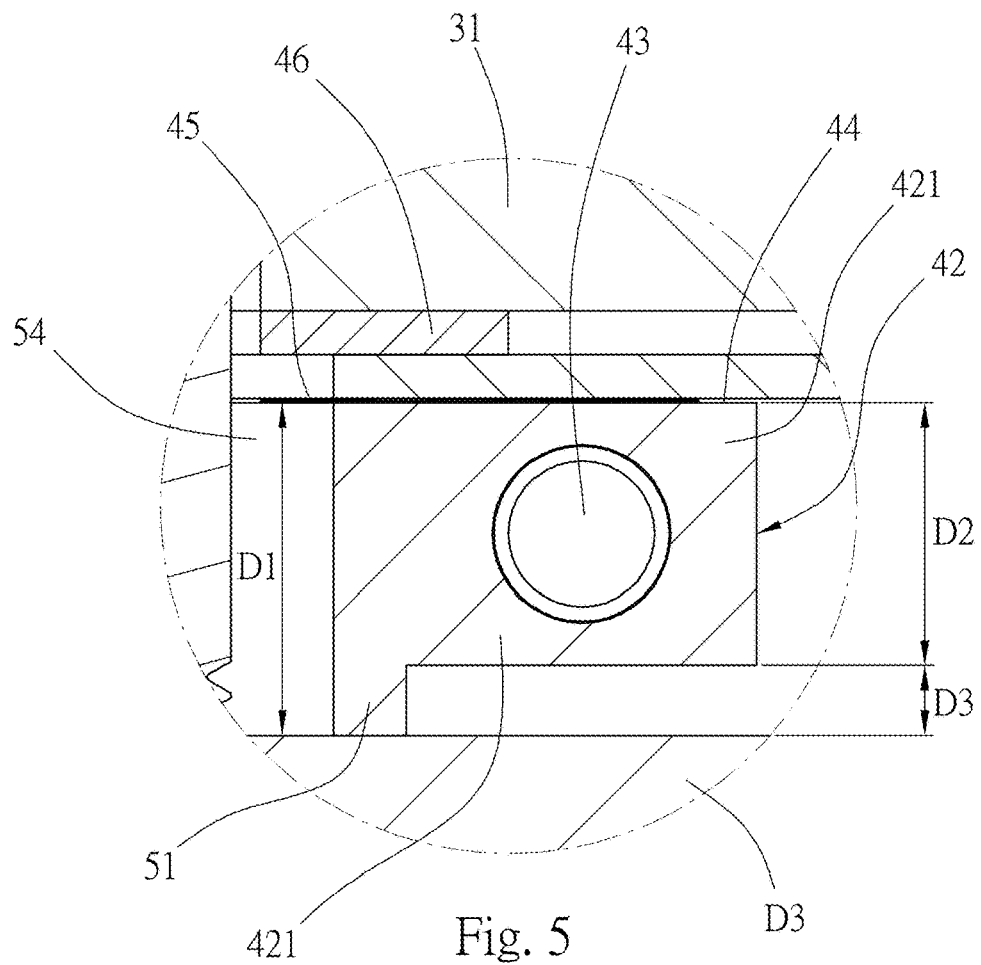
FIG. 5 is an enlarged view of a preferred embodiment of the present invention in the area A in FIG. 4.
Figure 6:
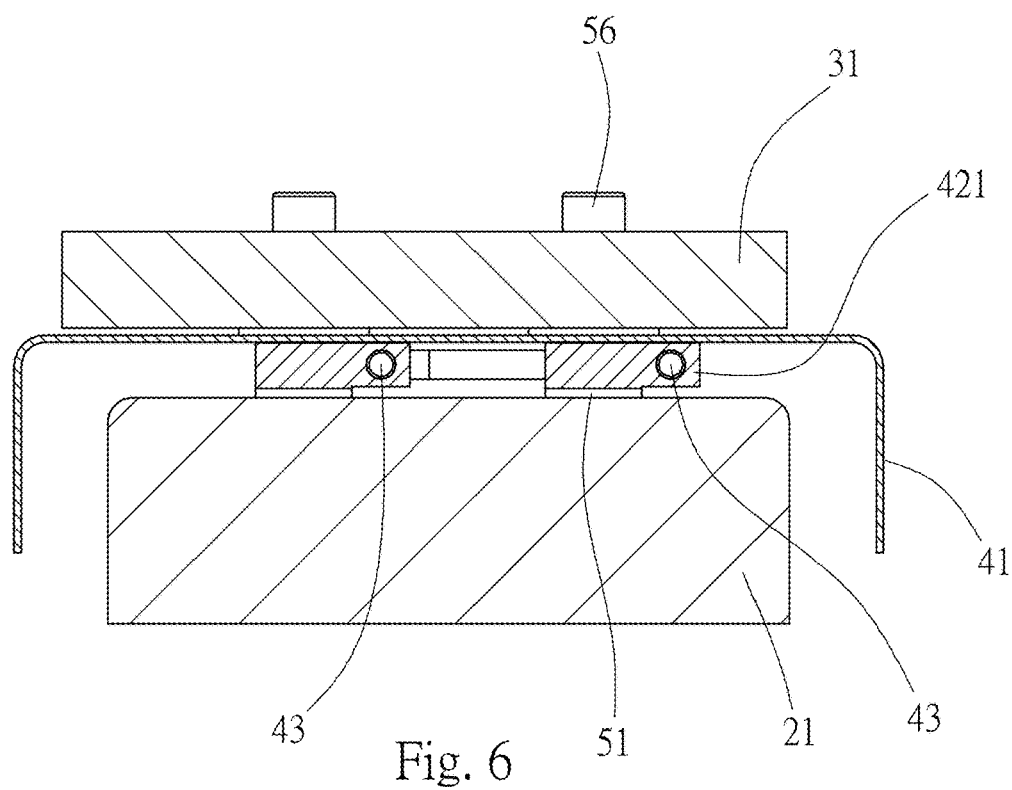
FIG. 6 is a sectional view of a preferred embodiment of the present invention along the section line 6-6 in FIG. 1.
Figure 7:
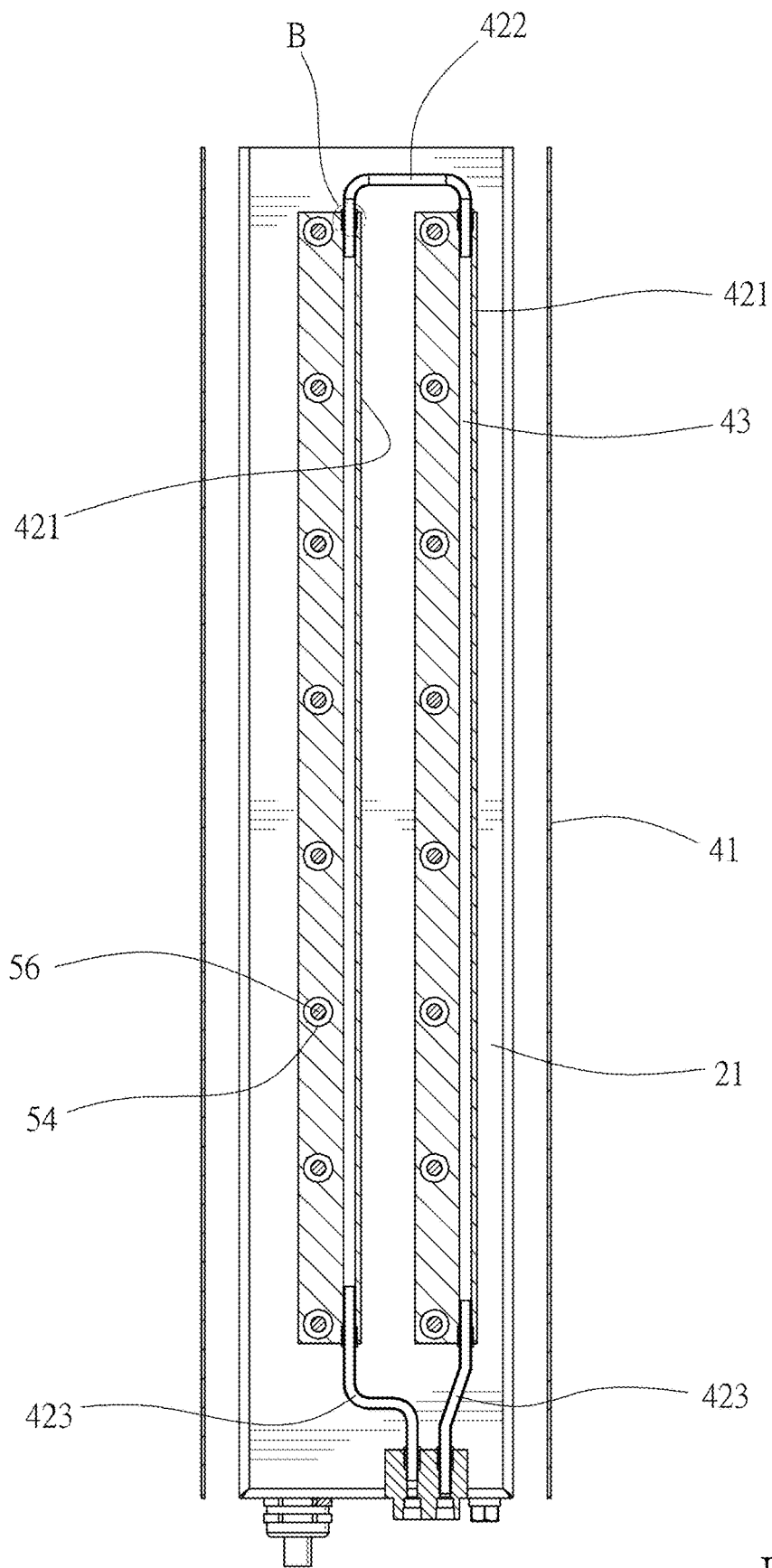
FIG. 7 is a sectional view of a preferred embodiment of the present invention along the section line 7-7 in FIG. 1.
Figure 8:
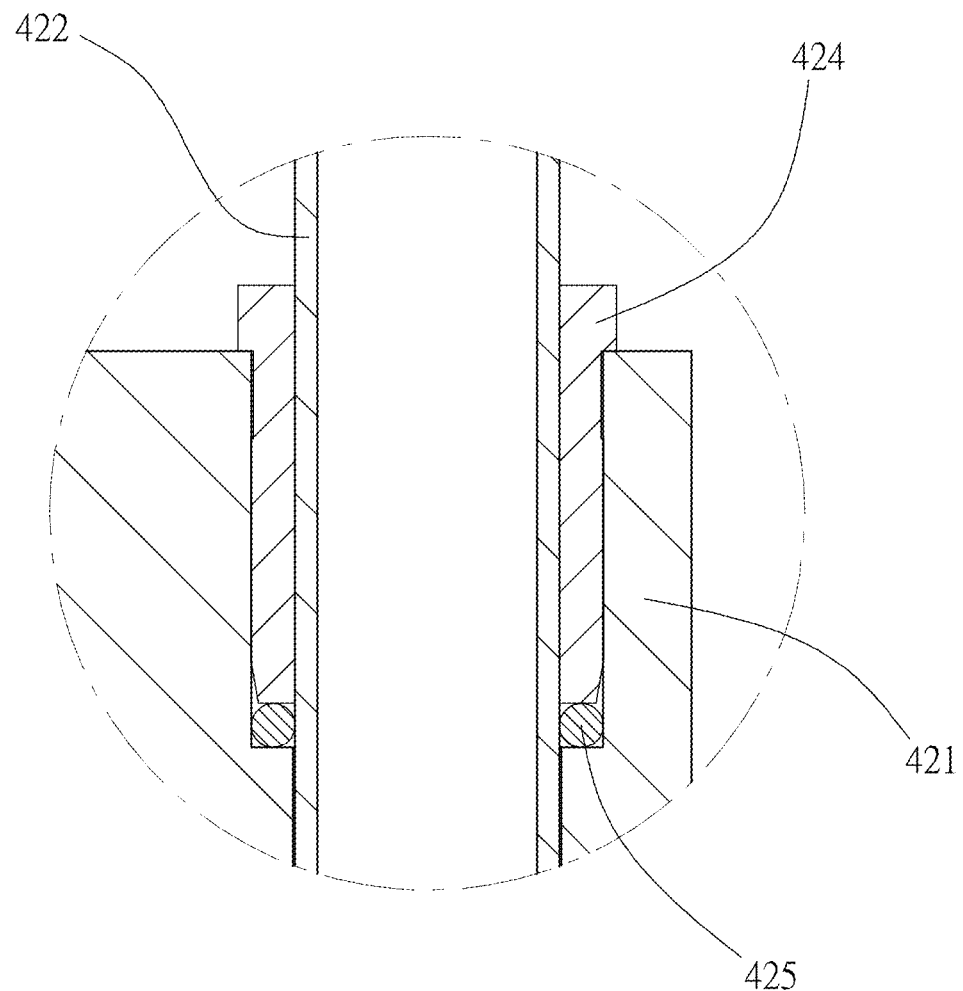
FIG. 8 is an enlarged view of a preferred embodiment of the present invention in the area B in FIG. 7.

With reference to the figures, a cooling mechanism (10) between a linear motor rotor and a platform coupled thereto according to a preferred embodiment of the present invention comprises essentially a linear motor (20), a platform (30), a cooling portion (40), and a fixation portion (50).

The linear motor (20) is a conventional motor in the art and is not intended to be improved by the present invention. Only the position of a rotor (21) of the linear motor (20) is illustrated in the drawings. Description or disclosure of its specific technical details and configuration is omitted since they are irrelevant to technical characteristics of the present invention.

The platform (30) is also a conventional one in the art, and can be used as a motion platform in precision machining machinery. It includes structurally a base (31) displaceable along with movement of the rotor (21).

The cooling portion (40) has a plate-like coupling seat (41) of a π-shape positioned between the base (31) and the rotor (21), a cooler (42) positioned between the coupling seat (41) and the rotor (21), and a passage (43) provided in the cooler (42), through which fluid flows. The passage (43) may be in communication with external tubing, so that cold fluid from outside enters the passage and flows therein, and once heated, flows outside, thereby enabling heat dissipation.

To reduce heat received by the cooling portion (40) that is transferred to the platform (30), which influences the precision of the platform (30), the cooling portion (40), in this embodiment, further includes a coupling plane (44) positioned on one side of the coupling seat (41) facing the cooler (42) and an insulating layer (45) positioned between the coupling plane (43) and the coupling seat (41) to prevent direct contact between the cooler (42) and the coupling seat (41). In this way, once heat from the linear motor (20) enters the cooler (42), the heat is blocked by the insulating layer (45) and prevented from being transferred further to the coupling seat (41) and thus indirectly prevented from being transferred to the platform (30) via the coupling seat (41).

Further, the cooler (42) includes two hollow extruded aluminum bars (421) in the shape of elongated strips that are parallel to and separated from each other. Each end of a U-shaped bent cascading tube (422) is secured respectively to one end of the long axis of the extruded aluminum bars (421), and one end of two fitting tubes (423) is secured respectively to the other end of the long axis of the extruded aluminum bars, in such a manner that the hollow interior of the extruded aluminum bars (421), the inner space of the cascading tube (422), and the inner space of the fitting tubes (423) form a passage (43). The coupling planes (44) are each positioned on one side of the long axis of the extruded aluminum bars (421).

The fixation portion (50) includes a plurality of block-shaped spacer seats (51) positioned respectively between the coupling seat (41) and the rotor (21). A plurality of first through holes (52) are provided through the base (31), a plurality of second through holes (53) are provided through the coupling seat (41), a plurality of third through holes (54) are provided through the spacer seat (51), and a plurality of coupling holes (55) are provided in the rotor (21), in such a manner that the first through holes (52), the second through holes (53), the third through holes (54), and the coupling holes (55) are opposite to each other in one-to-one coaxial correspondence. A plurality of bar-shaped couplers (56) respectively pass through the first through holes (52), the second through holes (53), and the third through holes (54) in one-to-one coaxial correspondence sequentially and are coupled into the coupling holes (55), so as to couple the base (31), the coupling seat (41), and the rotor (21) to each other.

The spacer seats (51) have a thickness (D1) greater than the thickness (D2) of the extruded aluminum bars (421), and one side of the spacer seats (51) is positioned in the same plane as the coupling plane (44) and the opposite side protrudes from the other side of the extruded aluminum bars (421). In this way, a suitable space (D3) is provided between the other side of the extruded aluminum bars (421) and the rotor (21) to prevent direct contact between the cooling portion (40) and the rotor (21) and thus reduce heat transfer.

For ease of assembly and machining, the spacer seats (51) are integrally molded on the other side of the long axis of the extruded aluminum bars (421). Such a configuration is integrally molded from aluminum through extrusion.

To further improve the effect of thermal insulation, the cooling portion (40) further includes a plurality of insulating pads (46) in the shape of annular discs that are sleeved over the couplers (55) and arranged between the base (31) and the coupling seat (41) to prevent direct contact between the base (31) and the coupling seat (41) and thus reduce heat transfer.

Further, to avoid the possibility that fluid leaks from positions where various elements forming the passage (43) are coupled, the cooler (42), in this embodiment, includes a plurality of tube joints (424) that are sleeved respectively over two ends of the cascading tube (422) and one end of the fitting tubes (423), and inserted in the extruded aluminum bars (421) and each abut against an inner shoulder surface of the extruded aluminum bars (421) via an O-ring (425), thereby enabling alignment and preventing leaking.

With the configuration of the members described above, the cooling mechanism (10) between the linear motor rotor and the platform coupled thereto enables thermal insulation by providing a suitable space between the cooling portion (40) and the rotor (21) through the spacer seats (51), and further improves the thermal insulation effect achieved by the present invention by blocking heat transfer to the platform (30) through the insulating layer (45) and the insulating pads (46), thereby ensuring the precision of the platform. In addition, the extruded aluminum bars (421) and the spacer seats (51) are made from aluminum through extrusion, which allows convenient manufacture. Further, products providing adhesion and thermal insulation, such as double-sided adhesive tapes, can be used as the insulating layer (45) and the insulating pads (46) allowing both thermal insulation and coupling, which allows even more convenience during manufacture, assembly, and machining.

REFERENCE NUMBERS

(10) cooling mechanism between linear motor rotor and platform coupled thereto
(20) linear motor
(21) rotor
(30) platform
(31) base
(40) cooling portion
(41) coupling seat
(42) cooler
(421) extruded aluminum bar
(422) cascading tube
(423) fitting tube
(424) tube joint
(425) O-ring
(43) passage
(44) coupling plane
(45) insulating layer
(46) insulating pad
(50) fixation portion

(51) spacer seat
(52) first through hole
(53) second through hole
(54) third through hole
(55) coupling hole
(56) coupler
(D1) thickness
(D2) thickness
(D3) space

What is claimed is:

1. A cooling mechanism between a linear motor rotor and a platform coupled thereto, comprising:
   a linear motor including a rotor;
   a platform including a base coupled to the rotor and displaceable along with movement of the rotor;
   a cooling portion including:
      a coupling seat positioned between the base and the rotor, a cooler positioned between the coupling seat and the rotor, and a passage provided inside the cooler and in communication with external tubing, allowing external fluid to enter the passage via the external tubing and flow in the passage and then out of the passage;
      a coupling plane positioned on one side of the cooler facing the coupling seat and an insulating layer between the coupling plane and the coupling seat, the coupling plane, the insulating layer, and the coupling seat overlapping each other closely; and
      at least one insulating pad sandwiched between the coupling seat and the base;
   a fixation portion comprising:
      a first through hole;
      a second through hole;
      a coupling hole;
      a coupler that are coaxial with each other, the first through hole being provided through the base, the second through hole being provided through the coupling seat, the coupling hole being provided in the rotor, and the coupler being in the shape of a bar and secured into the coupling hole through the first through hole and the second through hole sequentially;
   a spacer seat positioned between the rotor and the coupling seat, a third through hole passes through the spacer seat and is coaxial with the first through hole and the second through hole, and the coupler passes through the third through hole,
   wherein the cooler includes at least one extruded aluminum bar in the shape of an elongated strip positioned between the coupling seat and the rotor, and the coupling plane is positioned on one side of the long axis of the extruded aluminum bar and the spacer seat is molded integrally on the other side of the extruded aluminum bar, and
   wherein one side face of the spacer seat is positioned in the same plane as the coupling plane, and the other side face of the spacer seat facing away from the coupling plane protrudes from the extruded aluminum bar and abuts against the rotor to provide a space between the rotor and the extruded aluminum bar.

2. The cooling mechanism between a linear motor rotor and a platform coupled thereto of claim 1, wherein the insulating layer is adhesive and adheres the coupling plane to the coupling seat, so as to adhere the cooler to the coupling seat.

3. The cooling mechanism between a linear motor rotor and a platform coupled thereto of claim 2, wherein the insulating layer is a double-sided adhesive tape.

4. The cooling mechanism between a linear motor rotor and a platform coupled thereto of claim 1, wherein the cooler further includes at least two hollow extruded aluminum bars in the shape of elongated strips, each end of a bent cascading tube is secured respectively to one end of the long axis of the extruded aluminum bars, and one end of two fitting tubes is secured respectively to the other end of the long axis of the extruded aluminum bars, the hollow interior of the extruded aluminum bars, the inner space of the cascading tube, and the inner space of the fitting tubes forming the passage.

5. The cooling mechanism between a linear motor rotor and a platform coupled thereto of claim 1, wherein the insulating pad is in the shape of a ring and is sleeved over the coupler.

* * * * *